United States Patent [19]
McNamee

[11] 3,959,988
[45] June 1, 1976

[54] FLEXIBLE COUPLING

[76] Inventor: Anthony McNamee, 63, St. James Road, Prescot, Lancashire, England

[22] Filed: Nov. 8, 1974

[21] Appl. No.: 522,208

[30] Foreign Application Priority Data
Nov. 8, 1973 United Kingdom............... 52091/73

[52] U.S. Cl. .................................. 64/15 B; 64/13
[51] Int. Cl.² ........................................... F16D 3/52
[58] Field of Search .................... 64/13, 15 B, 15 R

[56] References Cited
UNITED STATES PATENTS

| 539,161 | 5/1895 | Almond | 64/15 |
|---|---|---|---|
| 2,770,113 | 11/1956 | Nelles | 64/15 R |
| 3,124,942 | 3/1964 | Rothfuss et al. | 64/13 |
| 3,677,031 | 7/1972 | Zieruk | 64/13 |

FOREIGN PATENTS OR APPLICATIONS

| 690.427 | 4/1940 | Germany | 64/15 R |
|---|---|---|---|

OTHER PUBLICATIONS
Metals Handbook Vol. 6, 8th Edition 1971, pp. 542–544.

*Primary Examiner*—Samuel Scott
*Assistant Examiner*—Randall Heald
*Attorney, Agent, or Firm*—Allison C. Collard

[57] ABSTRACT

A high-strength flexible shaft coupling comprises a plurality of concave annular diaphragms of sheet metal, each of substantially constant and equal thickness in radial cross-section, arranged in series upon a common axis with their concavities alternately facing in opposite axial directions. Adjacent diaphragms are joined together by electron beam welding at their respective radially inner or outer margins, and means are joined by electron beam welding to the radially inner or outer margin of those diaphragms which are at each axial end of the plurality for connecting the coupling to respective shafts. One class of example is directed to separating radial bending stresses from the welded areas in order to reduce fatigue effects and increase load-bearing capacity.

20 Claims, 7 Drawing Figures

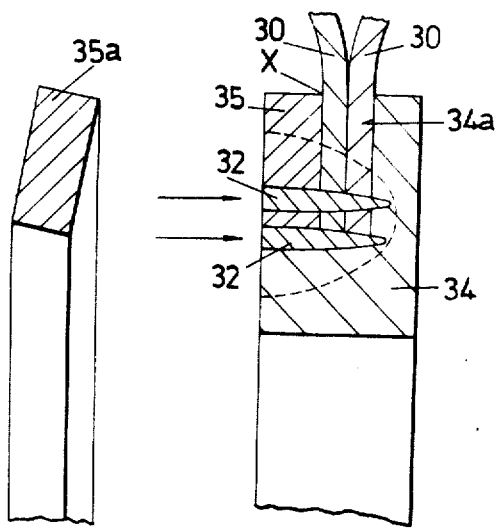
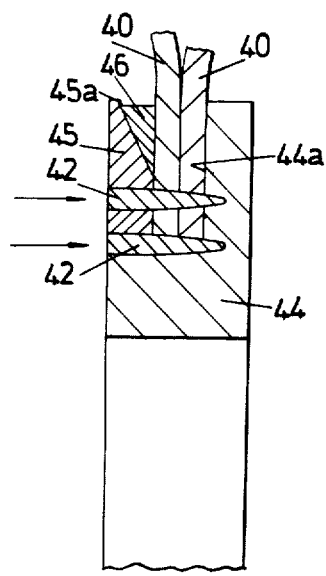
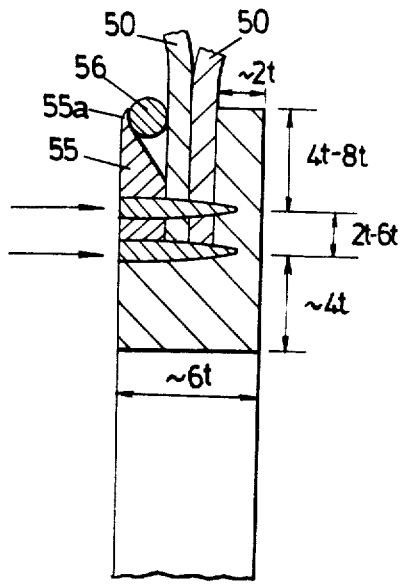
FIG.3b.  FIG.3a.  FIG.4.  FIG.5.

FLEXIBLE COUPLING

This invention relates to shaft couplings of the flexible type for transmitting torque and rotational motion. In particular, the invention concerns shaft couplings in which flexibility is afforded by means of torque-transmitting metal diaphragms.

The invention seeks to provide couplings which, in addition to satisfying the normal requirements of flexible shaft couplings, are simple in construction, inexpensive to manufacture, of low mass, capable of transmitting high torques and amenable to a long service under rigorous conditions, lubrication- and maintenance-free, substantially friction-free (and therefore virtually unlimited as to maximum rotational speed), and which are of such conception that the coupling designer is able to readily design highstrength couplings with flexibility characteristics amenable to widely differing operational settings.

Flexible shaft couplings have been proposed which comprise two or more annular metal diaphragms arranged in series and welded to one another alternately at their respective radially inner and outer margins, the diaphragms being substantially planar and having radially inner and outer margins of substantially greater axial thickness than the intermediate diaphragm portion to facilitate the welding and to accommodate axial and angular flexure of the coupling. Naturally, in order to form the diaphragms to the desired shape expensive machining is necessary, and it is a particular aim of the present invention to provide a flexible shaft coupling incorporating a series of annular metal diaphragms whilst avoiding the machining of diaphragms necessary hitherto.

According to the invention, a flexible shaft coupling comprises a plurality of concave, annular diaphragms of sheet metal, each of substantially constant and equal thickness in radial cross-section, arranged in series upon a common axis with their concavities alternately facing in opposite axial directions and adjacent diaphragms joined together by electron beam welding at their respective radially inner or outer margins, and means joined by electron beam welding to the radially inner or outer margin of those diaphragms which are at each axial and of the plurality for connecting the coupling to respective shafts.

In a simple form of the invention each joint between adjacent diaphragms and between the end diaphragms and said connecting means is formed by means of a circumferential electron beam edge weld, and in this event any such edge weld which forms a joint between the respective radially inner margins of adjacent diaphragms, or between the radially inner margin of an end diaphragm and one of said connecting means preferably has a depth of at least twice said thickness.

However, for reasons which will be explained subsequently, when it is desired to provide a particularly fatiguestrong coupling it is preferred that joints between the respective radially inner margins of adjacent diaphragms, and between the radially inner margins of end diaphragms and said connecting means (if that be the position at which the connecting means are joined to such diaphragms), are formed by means of one or more circumferential electron beam/stitch welds together with further means for supporting the or each diaphragm joined thereby for a predetermined radial distance outward of the outermost stitch weld to the extent that radial bending of the diaphragm(s) cannot occur over that distance. Similar joints may if desired also be provided between the radially outer margins of adjacent diaphragms, or between the radially outer margins of end diaphragms and said connecting means if that be the position at which the connecting means are joined to such diaphragms, although it is believed that for most applications of a flexible shaft coupling according to the invention an edge weld as mentioned above is adequate for joints at outer margin locations.

In any event, the diaphragms are preferably ogival (that is to say shaped like and elongated 'S') in radial cross-section, although their shape may be modified in order to suit any particular coupling application so that radial bending stresses are kept to a minimum for the selected size and thickness of diaphragm.

The invention will now be more particularly described, by way of example, with reference to the accompanying drawings, in which:

FIG. 3a shows a detail of FIG. 3 to an enlarged scale;

FIG. 3b shows an alternative form of locking ring for use in the embodiment of FIGS. 3 and 3a; and FIGS. 4 and 5 are views similar to FIG. 3a indicating variants thereof.

Figure 1:
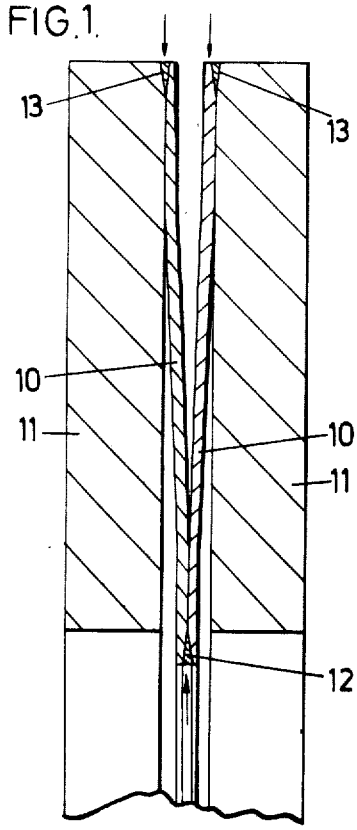
FIG. 1 is a half radial cross-section through a first embodiment of the invention.

Referring to FIG. 1, the coupling shown comprises a pair of identical concave, annular diaphragms 10 of high tensile steel disposed between a pair of end members 11 of e.g. mild steel and which may be adapted to any suitable manner in order to connect the coupling to respective shafts. The diaphragms 10 are of ogival form in radial cross-section, of constant thickness, and have an outer radius of approximately twice their inner radius, as is the case with the diaphragms shown in all subsequent figures, and are arranged on a common axis with their concavities facing away from each other in opposite axial directions. The diaphragms are joined together at their respective radially inner margins by a circumferential electron beam edge weld 12 and are joined to respective end members 11 around their radially outer margins by circumferential electron beam edge welds 13, the arrows in this and the subsequent figures indicating the direction of the electron beams used in each welding process.

Electron beam welding is utilized in the present invention since it is considered to be the only practical process known at the present time for achieving joints of the desired quality between the margins of a pair of thin metal diaphragms, or between the margin of such a diaphragm and an end member such as disclosed herein. It is a reliable and accurate welding process and is characterised by the production of only a relatively small heat-effected zone in the components being joined. It is of particular merit in the embodiments of FIGS. 1 and 2 since deep, narrow welds are readily made by this process thus enabling thin sheets of metal to be placed together and joined by edge welding, the depth of such welds being considerably greater than the thickness of the individual metal sheets. It also facilitates the joining together of disimilar metals such as the high tensile steel of the diaphragms and the lower grade mild steel of the end members.

Figure 2:
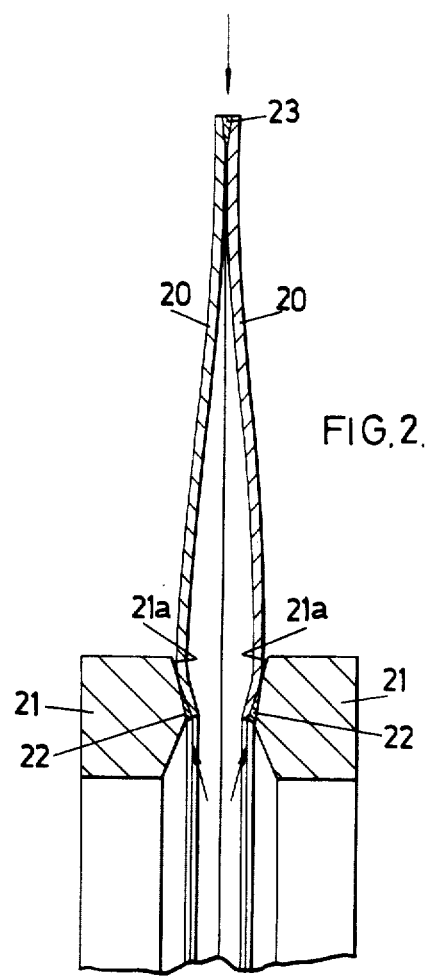
FIG. 2 is a similar view of a second embodiment of the invention.

The coupling shown in FIG. 2 can be considered to be the complement of that shown in FIG. 1 in that a pair of diaphragms 20 are in this case arranged on a common axis with their concavities facing towards each other in opposite axial directions. The diaphragms are joined together around their respective radially outer margins by a circumferential electron beam edge weld 23 and are joined to respective end members 21 for connecting the coupling to respective shafts, around their radially inner margins by circumferential electron beam edge welds 22.

Each end member 21 has an inclined face 21a, and each diaphragm inner margin is correspondingly inclined, so that when welding the diaphragm to the end members the electron beam can be directed towards the joint without interference, as indicated by the appropriate arrows in FIG. 2.

Although couplings comprising only two diaphragms have been shown in FIGS. 1 and 2 it will be appreciated that couplings employing any desired number of diaphragms with alternately facing concavities and joined together alternately at inner and outer margins may be produced in order to provide desired flexibility characteristics, and furthermore that odd numbers of diaphragms can be used equally as well as even numbers. If an odd number is used, the coupling will have an end member such as 11 at one end and an end member such as 21 at the other.

In a coupling of the type with which the invention is concerned, the stress induced in any diaphragm in use of the coupling generally speaking has two main components, viz the shear stress induced by torque-transmission and the stress due to the radial bending of the diaphragms as the coupling flexes, and both the maximum shear stress and maximum radial bending stress in any diaphragm occur at the point where the "working" portion of the diaphragm terminates and its radially inner joint begins. That is to say, in the embodiments of FIGS. 1 and 2, the maximum shear and radial bending stresses in diaphragms 10 and 20 occur immediately adjacent to the radially outer limits of welds 12 and 22, respectively, and it is convenient to refer to this point in each joint as the "critical point". Of course the "critical point" in reality is not a point at all but a circumferential line, but it is again convenient in the following analysis to consider stresses as they occur for a given radial cross-section of a coupling, i.e. as the couplings are depicted in the figures.

For coupings of the type shown in FIGS. 1 and 2 there is induced in each weld a reactionary bending stress which is at right angles to the radial bending moments in the diaphragm(s) joined thereby. Thus each weld is in compression at one radial end and in tension at the other, and the action of the tension is of course to tend to pull the joint apart. Considering welds 12 and 22, it is known that when the weld depth W equals the thickness t of the diaphragms then the reactionary bending stress in each weld is equal to the radial bending stress at the respective "critical point" and furthermore that as W is increased the weld stress reduces in inverse proportion to $W^2$; thus when $W = 2t$ the weld stress is one-fourth of the "critical point" radial bending stress. Accordingly, it is preferred in practice to make $W = 2t$ or greater at least insofar as inner welds such as 12 and 22 are concerned, if the couplings are to be capable of transmitting high torques. (A similar relationship of course exists between the reactionary bending stress induced in welds such as 13 and 23 in FIGS. 1 and 2 and the radial bending stress in the diaphragms 10 and 20 at the point where the "working" portion of the diaphragms terminate and the radially outer joints begin. However since the radial bending stress at this point is only approximately half of that at the critical point the actual depth of welds 13 and 23 is of less importance than that of welds 12 and 22).

Although couplings of the type described above with reference to FIGS. 1 and 2 represent a considerable advance over prior art couplings in many respects, even they are not considered to be suitable for certain applications where high torque transmission, (which term I exemplify by the transmission of torques in the order of tens of thousands of lb. in.), together with high fatigue strength is required. Briefly, this is considered to be due to a combination of factors. Firstly, it will be appreciated that for any given mode of angular displacement between two shafts coupled by a coupling of this type the radial bending stress in each diaphragm will normally alternate during every revolution of the coupling. Secondly, it is believed that due to the "notch" effect of welds such as 12 and 22 an unquantifyable stress concentration acts at the "critical point" which together with the alternating radial bending stress at this point, and bearing in mind that this is also the point of maximum shear stress and also lies within the welding heat-effected zone, (small though it is), can result in fatigue failure at the inner margin joints.

Figure 3:
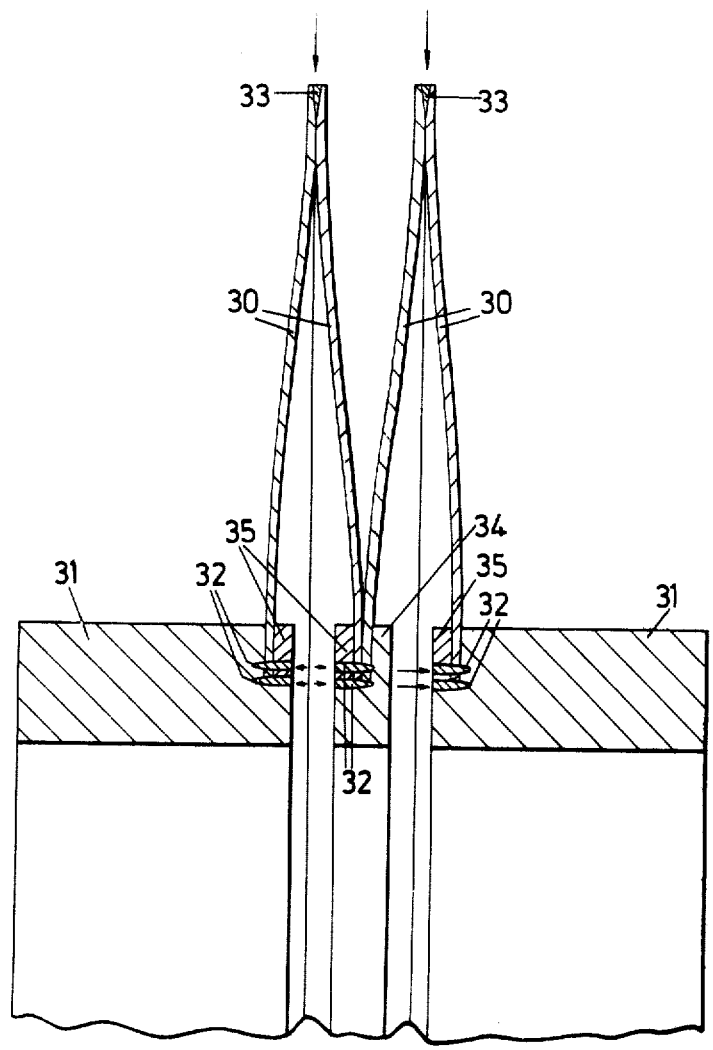
FIG. 3 is a similar view of a third embodiment of the invention.

Thus, in order to produce joints of higher fatigue strength the primary aim is to separate the alternating radial bending stress from any stress concentration in the welded areas, (which not only reduces fatigue effects but also permits the welds to withstand a higher shear stress — thereby increasing the torque transmitting capacity of the coupling — than would otherwise be the case), and this may be achieved by incorporating joints of the type shown in FIGS. 3 to 5.

The coupling shown in FIG. 3 comprises two pairs of diaphragms 30 (although as before any desired number of diaphragms may be employed), adjacent diaphragms being joined together alternately at their respective radially outer and inner margins and the two end diaphragms being joined to end members 31 at their radial inner margins. The joints between diaphragms at their outer margins comprise electron beam edge welds 33 similar to the welds 12 and 23 in FIGS. 1 and 2. However the joints at the radially inner margins of the diaphragms are effected by a form of circumferential electron beam stitch welding.

Considering the centre joint of the coupling, which is shown to an enlarged scale in FIG. 3a, use is made of an annular intermediate member 34 of the same material (e.g mild steel) as the end members 31. The member 34 has an annular rebate within which the inner margins of the two diaphragms together with a metal support ring 35 are received, and the whole assembly of diaphragms, member 34 and ring 35 is made fast with two deeply penetrating stitch welds 32, although more (or fewer) stitches may be employed depending on the particular configuration of parts 34 and 35 used. Clearly, two stitches will result in a more favourable load distribution than will a single stitch.

The purpose of ring 35, together with the annular shoulder 34a of member 34 which opposes it, is to support the diaphragms for a certain radial distance, (believed to be preferably from 4t to 8t where t is the diaphragm thickness), outward of the outermost stitch weld to such an extent that radial bending of the diaphragms over this length cannot occur; in this manner, the welds 32 are not subjected to radial bending stresses. It is thus imperative that the diaphragms be securely held between ring and shoulder and it is believed that a permitted deflection of the diaphragms as small as 0.0005 inches at the radial extremity of these supports would in some cases be sufficient to render the supports completely ineffective. Thus, use may advantageously be made of a pre-shaped, concave ring 35a, similar to a Belville washer, as shown in FIG. 3b, which will ensure that a positive pressure is applied to the diaphragms at the point X (FIG. 3a) after welding. It is also of importance that the support ring extends further radially outwards than does the heat-effected zone of the assembly, the anticipated heat-effected zone being shown enclosed by broken lines in FIG. 3a. Clearly, similar joints to that shown in FIG. 3a are provided between the diaphragms and end members 31 of FIG. 3.

FIG. 4 and 5 depict means whereby even tighter joints, in the sense of preventing radial bending, may be provided.

In FIG. 4 there is shown a pair of diaphragms 40 and an intermediate member 44 similar to that indicated at 34 in FIG. 3a. In this case the diaphragms are supported by the shoulder 44a of member 44 and a tapered ring 45 with an annular wedge 46. The assembly of diaphragms, member 44 and ring 45 is made fast with electron beam stitch welds 42 and the wedge 46 thereafter pushed hard home between ring 45 and diaphragms 40. The wedge, which is made in two semicircular halves, may be secured in position by any suitable means such as by spot electron beam welds or by crimping over the outer edge 45a of ring 45.

The arangement of FIG. 5 is similar to that of FIG. 4, except that in this case the wedge of FIG. 4 is replaced by a ring of wire 56 which is interposed under tension between the tapered ring 55 and diaphragms 50 and may thereafter be secured by crimping over the outer edge 55a of ring 55 as shown in the figure. FIG. 5 also serves to indicate the preferred dimensions of the components in joints of the type shown in FIGS. 3a to 5, in terms of the thickness t of the diaphragms.

In addition to the increased fatigue strength of the joints described above with reference to FIGS. 3a to 5 joints of this type are also advantageous when used to join diaphragms to end members such as 31 inasmuch as there is considerable weld area contact between the high tensile diaphragms and the mild steel end members, which helps to reduce the shear load in the end members.

Although fatigue-strengthened joints have been described above with reference only to joints at the inner margins of diaphragms, there may be instances where the outer margin joints need also to be made particularly strong, in which case means such as described with reference to FIGS. 3a to 5, suitably adapted, may be incorporated at the outer joints also.

I claim:

1. A flexible shaft coupling comprising a plurality of concave annular diaphragms of sheet metal, each of substantially constant and equal thickness in radial cross-section, arranged in series upon a common axis with their concavities alternately facing in opposite axial directions and with adjacent diaphragms joined together by substantially continuous circumferential electron beam welds at their radially inner and outer margins, respectively, and means joined by substantially continuous circumferential electron beam welds to the radially inner or outer margin, respectively, of those diaphragms which are at each axial end of the plurality for connecting the coupling to respective shafts.

2. A coupling according to claim 1 in which each joint between adjacent diaphragms and between the end diaphragms and said connecting means is formed by means of a respective substantially continuous circumferential electron beam edge weld.

3. A coupling according to claim 2 in which any said edge weld which forms a joint between the respective radially inner margins of adjacent diaphragms has a depth of at least twice said thickness.

4. A coupling according to claim 1 in which a joint between the respective radially inner margins of adjacent diaphragms is formed by means of at least one substantially continuous circumferential electron beam switch weld together with further means for supporting the diaphragms for a predetermined radial distance outward of the outermost stitch weld to the extend that radial bending of the diaphragms cannot occur over said distance.

5. A coupling according to claim 4 in which said predetermined distance is in the range of four to eight times said thickness.

6. A coupling according to claim 4 comprising a member having an annular rebate, the radially inner margins of said adjacent diaphragms being received within the rebate with the margin of one of said diaphragms abutting an annular shoulder which defines one side of the rebate, and a metal ring also received within the rebate and abutting the margin of the other of said diaphragms, said member, diaphragms and ring being made fast by means of at least one of said stitch welds.

7. A coupling according to claim 6 in which said ring is concave prior to its reception in said rebate.

8. A coupling according to claim 6 in which said ring has a face which tapers away from the diaphragm which the ring abuts, and a wedge is interposed between said face and diaphragm.

9. A coupling according to claim 6 in which said ring has a face which tapers away from the diaphragm which the ring abuts, and a wire is interposed between said face and diaphragm.

10. A coupling according to claim 1 in which a joint between the radially inner margin of an end diaphragm and one of said connecting means is formed by means of at least one substantially continuous circumferential electron beam stitch weld together with further means for supporting the diaphragm for a predetermined radial distance outward of the outermost stitch weld to the extent that radial bending of the diaphragm cannot occur over such distance.

11. A coupling according to claim 10 in which said predetermined distance is in the range of four to eight times said thickness.

12. A coupling according to claim 10 in which said connecting means has an annular rebate, the radially inner margin of said end diaphragm being received within the rebate and abutting an annular shoulder which defines one side of the rebate, and a metal ring also received within the rebate and abutting said margin on the opposite side to its abutment with the shoulder, said connecting means, diaphragm and ring being made fast by means of at least one of said stitch welds.

13. A coupling according to claim 12 in which said ring is concave prior to its reception in said rebate.

14. A coupling according to claim 12 in which said ring has a face which tapers away from the diaphragm which the ring abuts, and a wedge is interposed between said face and diaphragm.

15. A coupling according to claim 12 in which said ring has a face which tapers away from the diaphragm which the ring abuts, and a wire is interposed between said face and diaphragm.

16. A coupling according to claim 1 in which said diapragms are ogival in radial cross-section.

17. A coupling according to claim 1 comprising an even number of diaphragms with said connecting means joined to said end diaphragms at the radially inner margins of the diaphragms.

18. A coupling according to claim 1 comprising an even number of diaphragms with said connecting means joined to said end diaphragms at the radially outer margins of the diaphragms.

19. A coupling according to claim 1 comprising an odd number of diaphragms with a respective connecting means joined to a first of said end diaphragms at the radially inner margin of the diaphragm and a respective connecting means joined to the second of said end diaphragms at the radially outer margin of the diaphragm.

20. A coupling according to claim 2 in which any said edge weld which forms a joint between the radially inner margin of an end diaphragm and one of said connecting means, has a depth of at least twice said thickness.

* * * * *